United States Patent [19]

Balatan

[11] 4,105,615

[45] Aug. 8, 1978

[54] INTERPOLYMERS, METHOD OF PREPARING THE SAME AND EMULSIONS THEREOF, AND METAL CANS COATED WITH THE INTERPOLYMERS

[75] Inventor: Sergio E. Balatan, Westland, Mich.

[73] Assignee: M&T Chemicals Inc., Stamford, Conn.

[21] Appl. No.: 817,215

[22] Filed: Jul. 20, 1977

Related U.S. Application Data

[62] Division of Ser. No. 715,063, Aug. 17, 1976, abandoned.

[51] Int. Cl.$^2$ .................... C08L 33/02; C08L 33/08; C08L 33/12; C08L 33/24
[52] U.S. Cl. ................ 260/29.6 T; 220/470; 260/29.6 TA; 426/131; 428/35; 428/458; 428/461; 428/463; 526/304; 526/317; 526/320; 526/329
[58] Field of Search .............. 260/29.6 T, 29.6 TA

[56] References Cited

U.S. PATENT DOCUMENTS

| | | | |
|---|---|---|---|
| 3,661,827 | 5/1972 | Taft | 526/320 |
| 3,896,072 | 7/1975 | Tummler et al. | 260/29.6 TA |
| 3,976,614 | 8/1976 | Elms et al. | 260/29.6 T |
| 3,980,602 | 9/1976 | Jakubauskas | 260/29.6 T |
| 3,991,216 | 11/1976 | Christenson et al. | 220/64 |

*Primary Examiner*—M. J. Welsh
*Attorney, Agent, or Firm*—Kenneth G. Wheeless; Robert Spector

[57] ABSTRACT

The invention relates to a novel method of preparing aqueous polymeric colloids comprising the steps of (a) polymerization in organic solvent at high concentration of the monomers (b) emulsification of the resultant polymer solution in water using small proportion of surfactant. The pH of the resulting emulsion is adjusted to 6.5 to 10 with amines. The structure of the polymers in the present invention is highly hydrophobic so that, even at full neutralization of the carboxylic acid groups with amines, it would not produce an aqueous solution. Furthermore, in the absence of surfactant, a stable colloidal emulsion cannot be attained.

The aqueous coating composition has satisfactory performance as interior and/or exterior coating for food, beer, beverage and other metal containers. The emulsions can be easily applied by spraying or direct roller coating and baked to give films of outstanding properties.

18 Claims, No Drawings

INTERPOLYMERS, METHOD OF PREPARING THE SAME AND EMULSIONS THEREOF, AND METAL CANS COATED WITH THE INTERPOLYMERS

This is a divisional of application Ser. No. 715,063, filed Aug. 17, 1976, and now abandoned.

BACKGROUND OF THE INVENTION

In the prior art, coating compositions used as interior linings for food, beer and beverage metal containers, generally epoxy and vinyl chloride - vinyl acetate copolymers, were applied from organic solvents. However, due to air pollution regulations and solvent shortage problems, effort is being expended towards developing new coatings compositions which can be applied from water containing blends and such compositions have satisfactory performance as interior linings for food, beer and beverage metal containers. The amount of volatile organic solvent in the blend should be no more than 20% by volume.

Accordingly, the principal objectives of the present invention are to (1) Provide such new coating compositions;

(2) Provide a new method of preparing such coating compositions which overcomes certain deficiencies of aqueous polymeric colloids made to two general methods known in the art as follows:

Method I

Highly carboxylic polymers, synthesized in organic solvents, are transferred in water by partial or full neutralization of the carboxylic groups. Colloidal emulsions are produced by partially neutralizing the acid groups with amines. In order to obtain adequate dispersibility and emulsion stability, the general practice is to incorporate high percentage of carboxylic acid groups in the polymer. Substantial amount of amines is required to neutralize the acid groups. The amine can retard the rate of cure of the film, thereby adversely affecting the quality of the cured film. If sufficient amount of amine is added to fully neutralize the carboxyl groups, an aqueous solution is obtained. This system is generally noted for bubbling or foaming during application, especially with the use of roller coater or airless spray equipment. To suppress the foam, special defoamers such as silicones are incorporated. However, the use of such additive could produce undesirable side effects such as poor adhesion between multiple coatings or poor recoatability of the coated surface. Moreover, over a period of time, the additive could migrate through surfaces with which the coating is in contact. The subsequent contamination of the surface can cause problems such as eyeholing, cratering and the like.

Method II

Polymers synthesized in an aqueous medium in the presence of surfactants by the well known method of emulsion polymerization. The surfactants and other additives used for stabilization of the resultant polymeric colloid tend to reduce water or blush resistance of the cured film. This can be observed when the coated substrate is pasteurized in beer or in water at 160° F for ½ hour. The blush is the degree of milkiness or whitening which occurs in the coating.

In the present invention, the foregoing problems characteristic of the prior art are avoided. The polymers synthesized in organic solvents can be made more hydrophobic than in Method I but, nevertheless, can yield a polymeric colloid in water by surfactant addition. The structure of the polymer in the present invention is highly hydrophobic so that, even at full neutralization of the carboxylic acid group with amines, it would not produce a true solution in water. Furthermore, in the absence of surfactant, a stable colloidal emulsion cannot be attained.

For subsequent emulsification of the polymer solution in water, only a small proportion of emulsifier is required. Although the basic structure of the polymer is highly hydrophobic, the resulting emulsion does not require any post addition of additives usually required by aqueous polymeric colloids prepared by Method II.

Therefore, the unique advantage of the present method to prepare a polymeric colloid in water is that the structure of the copolymers can be made more hydrophobic than those of Method I, and the amount of surfactant required to produce an emulsion is less than in Method II. Thus, the present novel method of coating preparation is better suited for container coatings than aqueous coatings made in the prior art.

In connection with the emulsification of the polymer solution, the surfactant used are preferably anionic and/or nonionic emulsifiers such as octylphenoxyethanol, nonylphenoxyethanol amine polyglycol condensate, ammonium or sodium salt of alkyl aryl polyether sulfanate, ammonium or sodium salt of sulfated alkyl phenoxyethanol and the like. The proportion of emulsifier based on the weight of the polymer is preferably 0.25% to 3% by weight.

The emulsion can be easily applied by spraying or direct roller coating, and the film can be cured by heating at temperatures of approximately 300° F to 450° F for 2 to 10 minutes. Such brief heating to produce an insoluble film is adequate for coatings prepared from Type I and Type III polymers described below. However, aqueous compositions of Type II polymers must be prepared with conventional external crosslinkers such as phenolic and amine resins in order to produce an insoluble film under the aforementioned conditions.

DESCRIPTION OF THE PREFERRED EMBODIMENTS

The polymers of the present invention have glass transition temperature of about −6° C to about +30° C. The three different types of polymeric structures embodied in this invention are defined by their contents of monomers as follows:

Type I

Self Reactive Copolymers. Will cure to an insoluble film upon heating.

Compositon, by weight 15 to 60 percent of aromatic vinyl monomer preferably styrene.

20 to 50 percent of any long chain acrylate ester monomer can be used; nButyl acrylate, isobutylacrylate and 2 ethyl hexyl acrylate are preferred.

3 to 30 percent of alkoxyalkyl(meth)acrylamide such as isobutyoxy methyl acrylamide.

0 to 12 percent of unsaturated carboxylic acid monomer such as acrylic acid and methacrylic acid monomer. The amount of acid incorporated is adjusted to produce an insoluble polymer in water even at full neutralization of the carboxyl groups with amines. The polymer requires the addition of surfactant to produce a stable emulsion.

Type II

Potentially Reactive Copolymers. Require the addition of external crosslinker such as phenolic and amine resins.

Composition, by weight 15 to 60 percent of aromatic vinyl monomer preferably styrene.

25 to 50 percent of any long chain acrylate ester monomer can be used; nButyl acrylate, isobutylacrylate and 2 ethyl hexyl acrylate are preferred.

3 to 30 percent of hydroxy alkyl ester of an unsaturated carboxylic acid such as 2-hydroxyethyl acrylate, 2 hydroxyethyl methacrylate, hydroxy propyl acrylate and hydroxy propyl methacrylate.

0 to 12 percent of unsaturated carboxylic acid monomer such as acrylic acid and methacrylic acid monomer. The amount of acid incorporated is adjusted to produce an insoluble polymer in water even at full neutralization of the carboxyl groups with amines. The polymer requires the addition of surfactant to produce a stable emulsion.

Type III

Hybrid of Type I and Type II Copolymers. May or may not require external crosslinking depending on the design of the specific polymer composition.

Composition, by weight 15 to 60 percent of aromatic vinyl monomer preferably styrene.

25 to 50 percent of any long chain acrylate ester monomer can be used; nButyl acrylate, isobutylacrylate and 2 ethyl hexyl acrylate are preferred.

3 to 30 percent of alkoxy alkyl(meth)acrylamide such as isobutoxy methyl acrylamide.

3 to 30 percent of hydroxy alkyl ester of an unsaturated carboxylic acid monomer such as 2-hydroxyethyl acrylate, 2 hydroxyethyl methacrylate, hydroxy propyl acrylate and hydroxy propyl methacrylate.

0 to 12 percent of unsaturated carboxylic acid monomer such as acrylic acid and methacrylic acid monomer. The amount of acid incorporated is adjusted to produce an insoluble polymer in water even at full neutralization of the carboxyl groups with amines. The polymer requires the addition of surfactant to produce a stable emulsion.

The free radical initiator for the polymerization is any conventional one such as benzoyl peroxide test-butyl perbenzoate, test-butyl peracetate, cumene hydroperoxide and the like.

Solvents preferred for use in the invention are hydrophobic ones such as ketones, hydrocarbons, esters and long chain monohydric aliphatic alcohols. A combination of hydrophobic and hydrophilic solvents is also satisfactory.

The polymerization is carried out in the desired solvent or solvent combination and at high monomer concentration, preferably about 60 percent to about 80 percent by weight based on the total weight of polymerization solution. The proportion of the free radical initiator is about 0.5 percent to about 6 percent by weight based on the total weight of the monomers.

Emulsification is carried out by mixing the resultant polymer solution with water and small proportion of surfactant to produce an oil in water emulsion system.

The pH of the resulting emulsion is adjusted to 6.5 to 10 with amines.

The invention is illustrated by the following examples, which are given for purposes of illustration only and not to be construed as limiting its scope. Parts or percentages are being given on weight basis:

EXAMPLE I

IA. Preparation of the Polymer

| Constituents | Parts |
|---|---|
| Primary Amyl Acetate | 25.55 |
| NButanol | 4.50 |
| Benzoyl Peroxide | 1.00 |
| Styrene | 33.10 |
| 2 Ethyl Hexyl Acrylate | 30.34 |
| Isobutoxy Methyl Acrylamide | 4.65 |
| Methacrylic Acid | 0.86 |
| | 100.00 |

Procedure

Charge solvents to reaction vessel equipped with thermometer inert gas sparge, total condenser, addition funnel and glass or stainless steel agitator. Sparge with inert gas and preheat solvents to 95° C. Mix monomers and benzoyl peroxide initiator together in separate container. Add the premixed items to the reactor vessel with agitation over a period of approximately 4 hours. Continue to react for five additional hours or until conversion to polymer is complete. Cool rapidly to 60° C. Fill off into lined containers.

Viscosity of Polymer Solution = 35,000 cps at 80° F

IB. Preparation of the Emulsion

| Constituents | Parts |
|---|---|
| Polymer Solution Prepared in Part IA | 100.0 |
| Anionic Emulsifier | 0.3 |
| Deionized Water | 140.2 |
| Di Methyl Ethanol Amine | 0.5 |
| | 241.0 |

Procedure

Charge first 2 items into stainless steel container. Mix for ten minutes. Add deionized water gradually to the container with moderate agitation until conversion occurs. At this point, the remainder of the water is rapidly added. Adjust pH with di methyl ethanol amine.

Physical Constants pH = 8.8
Viscosity = 20 secs. at 80° F #4 Ford Cup
Total solids = 29.8% by weight
Water/Organic Solvent = 80/20 by volume

EXAMPLE 2

2A. Preparation of the Polymer

| Constituents | Parts |
|---|---|
| Butyl Cellosolve Acetate | 15.00 |
| Xylene | 9.00 |
| Butanol | 6.00 |
| Benzoyl Peroxide | 1.00 |
| Styrene | 36.50 |
| nButyl Acrylate | 30.50 |
| Isobutyl Methyl Acrylamide | 2.00 |

-continued

| Constituents | Parts |
|---|---|
| | 100.00 |

Use the same polymerization as in Formula IA.

2B. Emulsification of the Polymer

| Constituents | Parts |
|---|---|
| Polymer Solution Prepared in Part 2A | 100.0 |
| Anionic Emulsifier | 0.6 |
| Deionized Water | 140.4 |
| Di Methyl Ethanol Amine | 0.5 |
| | 141.5 |

Use the same emulsification procedure as in Formula IB.

Physical Constants pH = 9.2
Viscosity = 18 secs. at 80° F #4 Ford Cup
Total Solids = 30.1% by weight
Water/Organic Solvent = 80/20 by volume

EXAMPLE 3

3A. Preparation of the Polymer

| Constituents | Parts |
|---|---|
| Xylene | 10.0 |
| Butyl Carbitol Acetate | 20.0 |
| Test Butyl Perbenzoate | 1.0 |
| Styrene | 27.3 |
| 2 Ethyl Hexyl Acrylate | 30.4 |
| 2 Hydroxy Ethyl Methacrylate | 10.7 |
| Acrylic Acid | 9.8 |
| | 100.0 |

Follow the same polymerization procedure as in Example IA.

3B. Emulsification of the Polymer with Amine Resin added as Crosslinker

| Constituents | Parts |
|---|---|
| Polymer Solution Prepared in Part 3A | 100.0 |
| Amine Crosslinker (60% solids) | 8.0 |
| Nonionic Emulsifier | 2.0 |
| Deionized Water | 140.0 |
| Di Methyl Ethanol Amine | 0.5 |
| | 250.5 |

Procedure

Charge first 3 times into stainless steel container. Mix for 10 minutes. Add gradually the deionized water with agitation until conversion occurs. At this point, the remainder of the water is rapidly added.

Physical Constants pH = 9.5
Total Solids = 30.3% by weight
Viscosity = 19 secs. at 80° F #4 Ford Cup
Water/Organic Solvent = 80/20 by volume 3C. Emulsification of the Polymer with Phenolic Resin added as Crosslinker

| Constituents | Parts |
|---|---|
| Polymer Solution Prepared in Part 3A | 100.0 |
| Phenolic Resin (50% solids) | 10.0 |
| Anionic Emulsifier | 0.6 |
| Deionized Water | 150.4 |
| Di Methyl Ethanol Amine | 0.5 |
| | 261.5 |

Use the same emulsification procedure as in Example 3B.

Physical Constants pH = 9.2
Viscosity = 18 secs. at 80° F #4 Ford Cup
Total Solids = 30.5% by weight
Water/Organic Solvent = 80/20 by volume

EXAMPLE 4

4A. Preparation of the Polymer

| Constituents | Parts |
|---|---|
| Methyl Amyl Alcohol | 25.20 |
| Butanol | 4.45 |
| Test Butyl Peracetate (75% active) | 1.40 |
| Styrene | 31.03 |
| 2 Ethyl Hexyl Acrylate | 27.58 |
| 2 Hydroxy Ethyl Acrylate | 4.83 |
| Isobutoxy Methyl Acrylamide | 4.13 |
| Methacrylic Acid | 1.38 |
| | 100.00 |

4B. Emulsification of the Polymer

| Constituents | Parts |
|---|---|
| Polymer Solution Prepared in Part 4A | 100.0 |
| Anionic Emulsifier | 0.3 |
| Deionized Water | 135.2 |
| Di Methyl Ethanol Amine | 0.5 |
| | 236.0 |

Use the same emulsification procedure as in Example IB.

4C. Emulsification of the Polymer with Amine Resin added as Crosslinker

| Constituents | Parts |
|---|---|
| Polymer Solution Prepared in Part 4A | 100.0 |
| Urea-Formaldehyde Condensate (60% solids) | 6.0 |
| Nonionic Emulsifier | 2.0 |
| Deionized Water | 140.0 |
| Di Methyl Ethanol Amine | 0.5 |
| | 248.5 |

Use the same emulsification procedure as in Example 3B.

Physical Constants pH = 9.5
Viscosity = 20 secs. at 80° F #4 Ford Cup
Water/Organic Volatile = 80/20 by volume

EVALUATION OF THE EMULSIONS

The preceding aqueous coating compositions were subjected to the following standard tests generally used to evaluate performance of metal container coatings. A commercial solvent based vinyl chloride - vinyl acetate copolymer was used as control.

1. Intercoat Adhesion

The coating variable is applied on a piece of commercially primed tin free steel at approximately 4 to 5 milligrams per square inch and baked at 320° F for 5 minutes. The cured coating was scored with a knife edge and the score is then covered with a scotch tape. The area proximate to the score is then examined to determine the amount of coating material which is removed with the scotch tape. The amount of coating material which comes off with the scotch tape is indicative of the adhesion.

2. Blush Resistance

The coated substrate is placed in beer or in water having a temperature of 160° F for one half hour. The blush of the coating is measured by the degree of milkiness and/or loss of gloss of the film.

3. Flavor Test

The test is designed to determine any change in flavor which may be imparted by the subject coating. It is carried out by placing into a bottle of beer strips of aluminum foil coated on both sides by the coating variable. The bottle is sealed tightly and stored at predetermined temperatures over a period of time and tasted by a flavor panel. The total amount of coating applied on about 40 square inch aluminum foil is usually approximately 200 milligrams and baked at 320° F for 5 minutes.

4. Turbidity Test

The test measures any change in clarity of the beer which may be imparted by the coating variable. Test specimens are prepared in the same manner as in flavor test. Turbidity is measured using a Mach Turbidity Meter and is expressed in Formazin Turbidity Units (FTU). A value of 15 to 30 FTU is normal for an acceptable bottle of beer.

Results are summarized in the following table.

| Coating Variable | Turbidity Data 3 Weeks at 100° F | Flavor Test | Intercoat Adhesion | Blush Resistance |
|---|---|---|---|---|
| Example No. 1B | 20 – 30 FTU | OK | OK | OK |
| Example No. 2B | 20 – 30 FTU | OK | OK | OK |
| Example No. 3B | 20 – 30 FTU | OK | OK | OK |
| Example No. 3C | 20 – 30 FTU | OK | OK | OK |
| Example No. 4B | 20 – 30 FTU | OK | OK | OK |
| Example No. 4C | 20 – 30 FTU | OK | OK | OK |
| Vinyl Control | 20 – 30 FTU | OK | OK | OK |

What is claimed is:

1. A method of preparing aqueous coating composition of hydrophobic copolymers comprising of the steps of
   (a) polymerizing monomers in organic solvent in the presence of about 0.5% to about 6% by weight of a free radical initiator based on the weight of the monomers and in which the total weight of the monomers is about 60% to about 80% by weight of the total charge, said monomers consisting of
   15 to 60% of aromatic vinyl monomer
   20 to 50% of a long chain acrylate ester monomer
   3 to 30% of an alkoxyalkyl(meth)acrylamide
   0 to 12% of an unsaturated carboxylic acid monomer
   (b) emulsification of the resultant copolymer solution in water using about 0.25% to about 3% by weight of surfactant based on the weight of the copolymer and adjusting pH of the resulting emulsion with amines to about 6.5 to 10.

2. The method of claim 1 in which the organic solvent comprises at least one member of the group consisting of ketones, hydrocarbons, esters, long chain aliphatic monohydric alcohols and glycol ethers.

3. The method of claim 1 in which the free radical initiator is selected from the group consisting of benzoyl peroxide, azobisisobutyronitrile, tert-butyl perbenzoate and tert butyl peracetate and cumene hydroperoxide.

4. The method of claim 1 in which the surfactant used is a nonionic and/or an anionic emulsifier selected from the group consisting of octylphenoxyethanol, nonylphenoxyethanol, amine polyglycol condensate, ammonium or sodium alkyl aryl polyether sulfonate ammonium or sodium salt of sulfated alkylphenoxyethanol.

5. A method of preparing aqueous coating composition of hydrophobic copolymers comprising of the steps of
   (a) polymerizing monomers in organic solvent in the presence of about 0.5% to about 6% by weight of free radical initiator based on the weight of the monomers and in which the total weight of the monomers is about 60% to about 80% by weight of the total charge, said monomers consisting of
   15 to 60% of aromatic vinyl monomer
   25 to 50% of a long chain acrylate ester monomer
   3to 30% of hydroxy alkyl ester of an unsaturated carboxylic acid
   0 to 12% of unsaturated carboxylic acid monomer
   (b) emulsification of the resultant polymer solution and an external crosslinker in water using about 0.25% to about 3% by weight of surfactant based on the weight of the copolymer and external crosslinker and adjusting the pH of the resulting emulsion to 6.5 to 10 with amines.

6. The method of claim 5 in which the organic solvent comprises at least one member of the group consisting of ketones, hydrocarbons, esters, long chain aliphatic monohydric alcohols and glycols ethers.

7. The method of claim 5 in which the free radical initiator is selected from the group consisting of benzoyl peroxide, tert butyl perbenzoate, tert butyl peracetate and cumene hydroperoxide.

8. The method of claim 5 in which the external crosslinker is an amine-formaldehyde condensate or a phenolformaldehyde condensate.

9. The method of claim 5 in which the surfactant is a nonionic or an anionic emulsifier.

10. A method of preparing aqueous coating composition of hydrophobic copolymers comprising of the steps of
   (a) polymerizing monomers in organic solvent in the presence of about 0.5% to about 6% by weight of free radical initiator based on the weight of the monomers and in which the total weight of the monomers is about 65% to about 80% by weight of the total charge, said monomers consisting of
   15 to 60% of aromatic vinyl monomer
   25 to 50 % of a long chain acrylate ester monomer
   3 to 30% of an alkoxy alkyl(meth)acrylamide
   3 to 30% of hydroxy alkyl ester of an unsaturated carboxylic acid monomer 0 to 12% of unsaturated carboxylic acid monomer (b) emulsification of the resultant polymer solution in water using about 0.25% to about 3% by weight of surfactant based on the weight of the copolymer and adjusting the pH of the resulting emulsion with amines to about 6.5 to 10.

11. The method of claim 10 in which the organic solvent comprises at least one member of the group consisting of ketones, hydrocarbons, esters, long chain aliphatic monohydric alcohols and glycol ethers.

12. The method of claim 10 in which the free radical initiator is selected from the group consisting of benzoyl peroxide, tert-butyl perbenzoate, tert butyl peracetate and cumene hydroperoxide.

13. The method of claim 10 in which the surfactant is a nonionic or an anionic emulsifier.

14. The method of preparing an aqueous coating composition of hydrophobic copolymers comprising the steps of (a) polymerizing monomers in organic solvent in the presence of about 0.5% to about 6% by weight of free radical initiator based on the weight of the monomers and in which the total weight of the monomers is about 60% to about 80% of the total charge, said monomers consisting of 15 to 60% of aromatic vinyl monomer 25 to 50% of a long chain acrylate ester monomer 3 to 30% of an alkoxy alkyl(meth)acrylamide 3 to 30% of hydroxy alkyl ester of an unsaturated carboxylic acid monomer 0 to 12% of an unsaturated carboxylic acid monomer (b) emulsification of the resultant polymer solution and an external crosslinker in water using about 0.25% to about 3% by weight of surfactant based on the weight of the copolymer and external crosslinker and adjusting the pH of the resulting emulsion to about 6.5 to 10 with amines.

15. The method of claim 14 in which the organic solvent is selected from the groups consisting of ketones, hydrocarbons, long chain aliphatic monohydric alcohols, glycol ethers and esters.

16. The method of claim 14 in which the free radical initiator is selected from the group consisting of benzoyl peroxide, tert butyl perbenzoate, tert butyl peracetate, cumene hydroperoxide and azobis isobutyronitrile.

17. The method of claim 14 in which the external crosslinker is an amine-formaldehyde condensate or a phenolformaldehyde condensate.

18. The method of claim 14 in which the surfactant is a nonionic or an anionic emulsifier.

* * * * *